(No Model.)

H. BARDSLEY.
MACHINE FOR SEEDING RAISINS.

No. 606,265.

3 Sheets—Sheet 1.

Patented June 28, 1898.

WITNESSES:
Frank Martin.
N. Marcus Shinn.

INVENTOR
Henry Bardsley,
BY John Shinn,
ATTORNEY.

(No Model.) 3 Sheets—Sheet 2.

H. BARDSLEY.
MACHINE FOR SEEDING RAISINS.

No. 606,265. Patented June 28, 1898.

WITNESSES
Frank Martin.
N. Marcus Shinn.

INVENTOR
Henry Bardsley,
BY John Shinn,
ATTORNEY.

(No Model.) 3 Sheets—Sheet 3.

H. BARDSLEY.
MACHINE FOR SEEDING RAISINS.

No. 606,265. Patented June 28, 1898.

WITNESSES:
Frank Martin.
N. Marcus Shinn.

INVENTOR
Henry Bardsley,
BY John Shinn,
ATTORNEY.

UNITED STATES PATENT OFFICE.

HENRY BARDSLEY, OF PALMYRA, NEW JERSEY.

MACHINE FOR SEEDING RAISINS.

SPECIFICATION forming part of Letters Patent No. 606,265, dated June 28, 1898.

Application filed January 10, 1898. Serial No. 666,214. (No model.)

*To all whom it may concern:*

Be it known that I, HENRY BARDSLEY, a citizen of the United States, residing at Palmyra, in the county of Burlington and State of New Jersey, have invented a new and useful Improvement in Machines for Seeding Raisins, of which the following is a specification.

My improvement relates to machines for removing seed from raisins. It is well known to those experienced in that work that if the seeds be forced from the raisin by spikes, quickly or by one pressure, much of the pulp is torn from the raisin with the seed. Therefore the impaling should be slow and gradual, which slow operation loosens the seed from the pulp and pushes them against the top skin, which skin when broken by the seed has a hole the size of the seed forced through. With my improvement I accomplish the object sought—that is, remove the seed with loss of pulp and mutilation of the fruit reduced to a minimum.

My invention consists in the combination of a cylinder provided with a series of spikes, a pressure-roller that only breaks the bottom skin and starts the impaling, a beater that will gradually force the seed from the pulp and against the top skin, a second pressure-roller that will break the top skin and force out the seeds, and a series of strippers for removing the seeded raisins from the spikes.

Mechanism for accomplishing the above is illustrated in the accompanying drawings.

Figure 1:
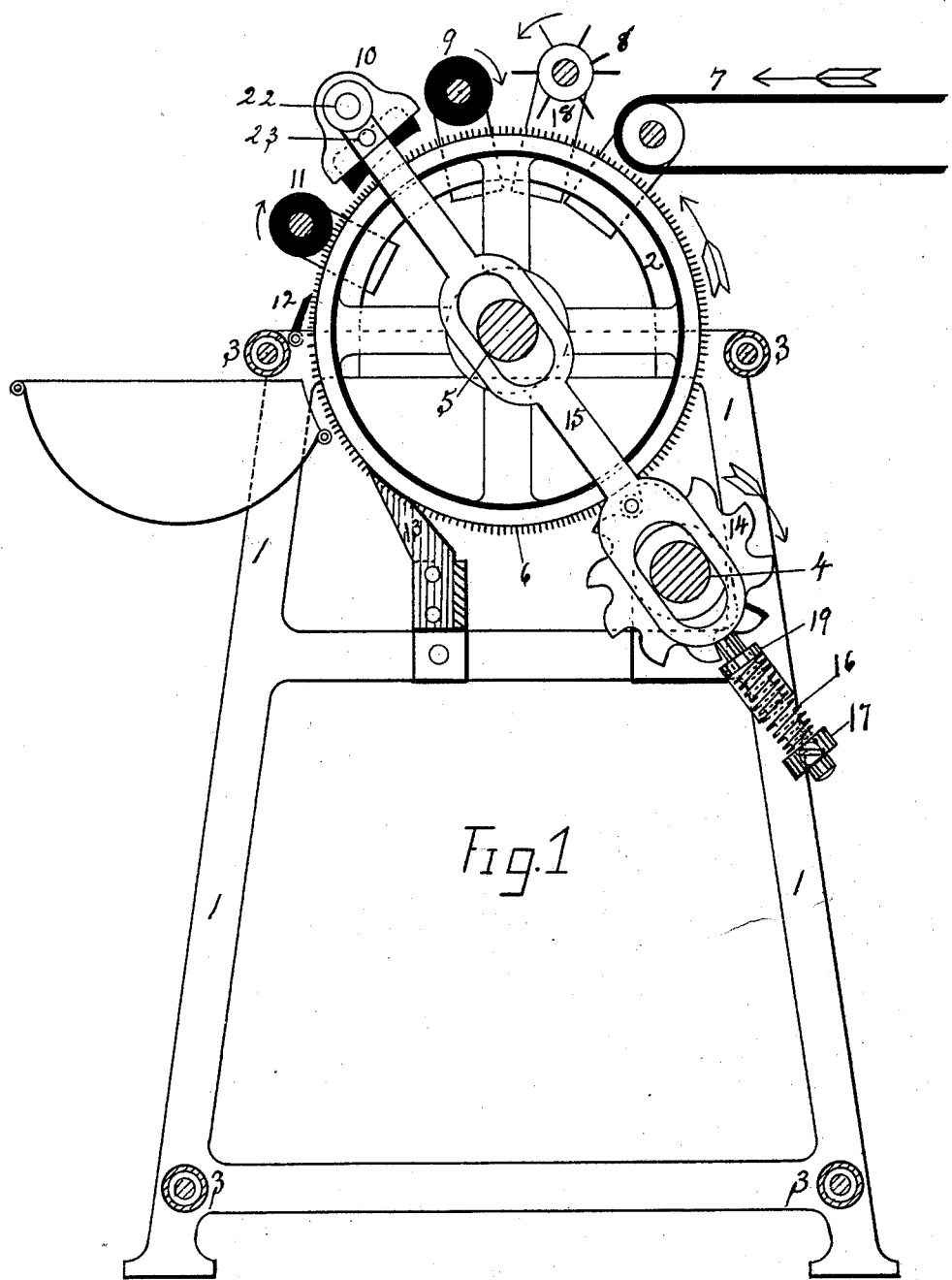
Figure 2:
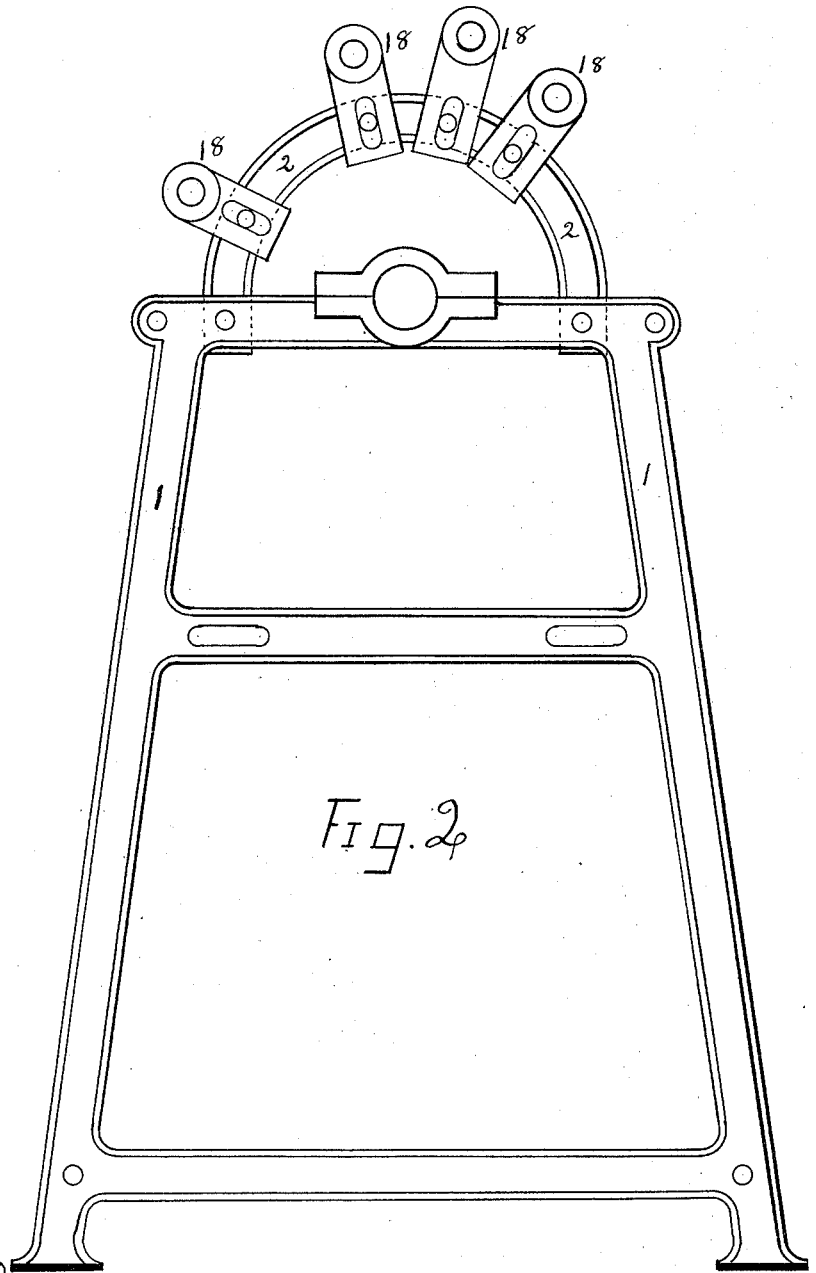
Figure 3:
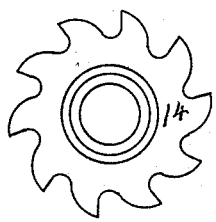
Figure 4:
Figure 5:
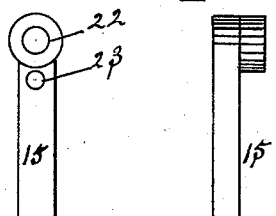
Figure 6:
Figure 7:
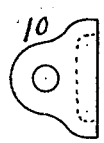
Figure 8:
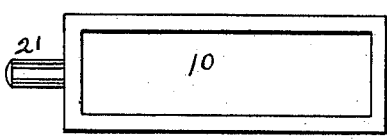
Figure 9:
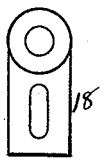
Figure 10:
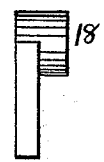
Figures 11, 12:
Figure 13:
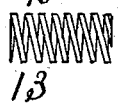
Figure 14:
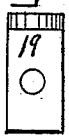
Figure 15:
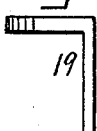
Figure 16:
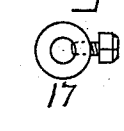
Figure 17:

Figure 1 is a vertical section of a machine constructed according to my invention. Fig. 2 is a view of one of the frame sides, arch, and puppet-heads. Figs. 3 and 4 are views of one of the tappet-cams. Figs. 5 and 6 are views of one of the connecting-yokes for connecting the cam to and operating the beater. Figs. 7 and 8 are views of the beater-box. Figs. 9 and 10 are views of one of the puppet-heads. Figs. 11 and 12 are views of the coiled spring. Figs. 13, 14, and 15 are views of a bracket. Figs. 16 and 17 are views of an adjusting-collar.

Same numerals of reference indicate same parts in all views.

The construction of my improved machine is as follows:

1 represents the frame sides. The form of the sides is plainly shown in Fig. 2.

2 represents the arch.

The two sides are connected by four bolts passing through tubes 3 3 3 3. (Shown in section, Fig. 1.) The bolts have a nut on each end. These four bolts and tubes firmly hold together the sides and make a strong yet cheap frame.

4 represents the main driving-shaft, 5 the cylinder-shaft, and 6 the cylinder. The cylinder 6 is provided with spikes that extend from the cylinder five-sixteenths of an inch and about one hundred and fifty spikes to the square inch. The spikes are about No. 14 wire gage, blunt on the ends. The cylinder is about ten inches wide and twelve inches diameter. It may be more or less.

7 represents the feed-apron; 8, the evener; 9, the first pressure-roller; 10, the beater; 11, the second pressure-roller; 12, the "doctor;" 13, the stripper; 14, the tappet-cam; 15, the connecting-yoke; 16, the coiled spring; 17, the regulating-collar; 18, the puppet-head; 19, the spring stop-bracket.

The pressure-rollers 9 and 11 are gum rollers mounted on iron shafts. The beater 11, that strikes the raisins, is made of a block of gum. (Shown in Fig. 1.)

The connecting bar or yoke 15 has a short slot 20. (See Fig. 5.) In this slot is fixed a stud carrying a small roller. (Shown by dotted lines in Fig. 1.) This roller works on the points of the cam 14 and operates the beater 10. The main shaft 4 carries two of the cams 14. The connecting-bars 15 are connected to the beater 10 by trunnions 21, fitted in the holes 22 of bar 15. The beater being adjusted on the trunnions is fixed by a steady-pin 23. (See Figs. 1 and 5.)

At the lower ends of connection-bars 15 is placed a coiled spring 16 and an adjusting-collar 17. The lower end of connecting bar or rod 15 works through bracket 19, fixed to the side 1.

The doctor 12 and "strippers" 13 are as usual in raisin-seeders, and not being new do not require description.

My invention lies solely in the beater, the other parts being claimed only in combination. The description has been and the operation will be confined mostly to the beater and connecting parts.

The operations are as follows: Motion is communicated to shaft 4 and cams 14, moving in direction of the arrow. The cams 14 operate the connections 15 and beater 10 and give the beater a rising-and-falling motion, assisted in the down movement by the spring 16. The blow of the beater on the raisins is adjusted by the collar 17. The cams 14 give beater fifteen blows, while the raisins pass under the beater, which gradually loosens the seed from the pulp and the spikes force them to the top skin. The cylinder is operated in the direction of the arrows and also the feed-apron 7. The spreader 8 moves as indicated by the arrow. The wings of the spreader prevent the raisins passing under the roller 9, one raisin upon another. The first pressure-roller 9 works in direction indicated by the arrow and at a speed that will cover the same space of spikes as moves under it. This pressure-roller breaks the bottom skin and fixes the raisins on the spikes. The operation of the beater has been above described. The second pressure-roller 11 is driven by the spikes and moves in direction indicated by the arrow. As the raisins are carried by the spikes under this roller the top skin will be broken and the seeds forced into the gum roller, but remain on the top of the spikes of the cylinder, from which the seeds are removed by the doctor 12 and drop into a receptacle below. The seeded raisins are carried by the spikes to the strippers 13, which strippers remove them from the spikes and drop them into a box below.

Having above fully described the construction and operation of my invention, what I claim as new, and desire to secure by Letters Patent, is—

In a machine for removing seed from raisins, the combination; consisting of a spiked cylinder, a pressure-roller, a beater with operating mechanism, a second pressure-roller, a doctor for removing the seed, and a series of strippers for removing the seeded raisins from the spikes, all substantially as shown and described.

HENRY BARDSLEY.

Witnesses:
JOHN SHINN,
WALTER PARKINSON.